June 20, 3,671,105

LIGHT REGULATOR

Filed April 28, 1971

INVENTORS
JERRY G. WILLIAMS
JOSEPH H. JUDD

BY
*Howard J. Osborn*
*William H. King*
ATTORNEYS

3,671,105
LIGHT REGULATOR

Jerry G. Williams, Hampton, and Joseph H. Judd, Newport News, Va., assignors to the United States of America as represented by the Administrator of the National Aeronautics and Space Administration
Filed Apr. 28, 1971, Ser. No. 138,227
Int. Cl. G02f 1/36
U.S. Cl. 350—161                                                 4 Claims

ABSTRACT OF THE DISCLOSURE

A thin absorbing metallic film deposited on a low-modulus transparent substrate and a mechanism for stretching the substrate. As the substrate is stretched, the thickness of the thin film decreases and microfractures occur thereby allowing an increase transmission of visible light through the thin film.

ORIGIN OF THE INVENTION

The invention described herein was made by employees of the National Aeronautics and Space Administration and may be manufactured and used by or for the Government for governmental purposes without the payment of any royalties thereon or therefor.

BACKGROUND OF THE INVENTION

The invention relates generally to a light regulator and more specifically concerns a device for regulating the transmission of electromagnetic energy, especially visible light through a thin film.

The disadvantage of the prior approaches to light transmission regulators is that they are not variable over a range of transmittances. That is, they have two discrete values of transmittance with no variation in between. As far as is known, there is no present method available for at-will varying the percent of incident ultraviolet, visible and low infrared light transmitted through a material. It is therefore the primary purpose of this invention to provide a light regulator that can be regulated over a continuous range of transmittances.

SUMMARY OF THE INVENTION

The essential elements of the invention are: a thin absorbing film deposited on a low-modulus transparent substrate, and a mechanism for stretching the substrate. The thin film thickness may be from a few angstroms to several hundred angstroms depending on the initial magnitude of transmittance desired. When the rays of a light source are directed into the thin film, the amount of transmission of the light through the film is directly related to the load on the substrate.

DETAILED DESCRIPTION OF THE INVENTION

Figure 1:
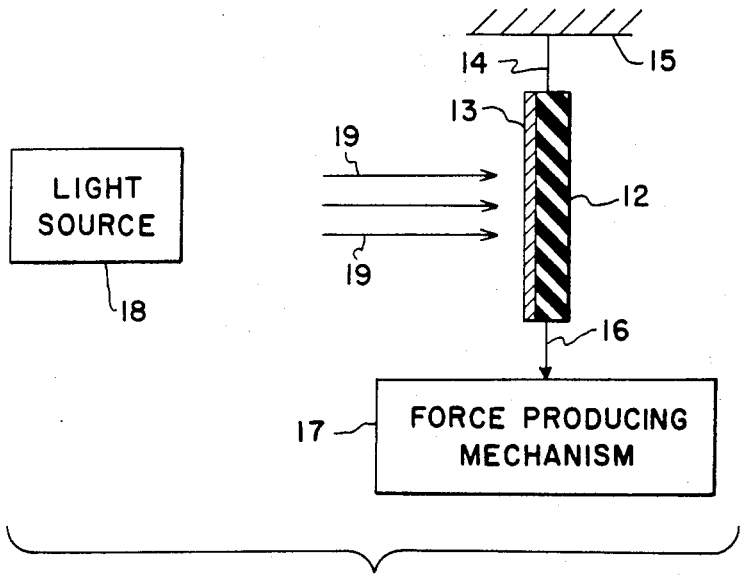
FIG. 1 is a schematic drawing of the invention.

Turning now to the embodiment of the invention selected for illustration in the drawings, the number 12 denotes a substrate on which is deposited a thin film 13. Substrate 12 is made from a clear elastomer of silicone rubber or urethane. These materials are capable of sustaining large deformations under relatively low loads and are therefore used when large changes in transmittance are desired. Otherwise, substrate materials that do not stretch as much are satisfactory. Thin film 13, which has a thickness from a few angstroms to several hundred angstroms (10 A. to 1000 A.) can be any highly absorbing thin film such as aluminum, gold, silver, indium, and copper. Substrate 12 is attached to a fixed support 15 by clamps 14. A force-producing mechanism 17 is attached to substrate 12 by clamps 16 to stretch the substrate. Force-producing mechanism 17 can be any device that will stretch substrate 12. When force-producing mechanism 17 applies a stretching force to substrate 12 the energy of light rays 19 from a light source 18 which is transmitted through thin film 13 and substrate 12 is proportional to the force applied by the force-producing mechanism 17. In general, the transmittance of thin film 13 increases with an increasing magnitude of force applied by force-producing mechanism 17. In some cases this transmittance is directly proportional to the force applied. The change in transmittance of thin film 13 is caused by two factors: (1) the change in the thin film effective thickness and (2) the development of microfractures in the thin film. Microscopic surface examination studies show that the accumulative width of microfractures per unit length increases with increasing magnitude of positive strain. For further information including tests on this invention see a Doctor of Philosophy Thesis entitled "Experimental Strain Analysis Technique for Large Deformations Based on the Optical Properties of a Thin Metallic Film Deposited on a Structural Substrate" by Jerry Gene Williams, dated May 1970, in the Virginia Polytechnic Institute Library at Blacksburg, Va.

Through judicious selection of materials and the initial thin film thickness, any desired range of variation in the magnitude in transmittance may be obtained. Also, the sensitivity may be controlled in the same manner. The main feature of the invention is that a continuous range of transmittances are possible rather than a couple of discrete values.

Figure 2:
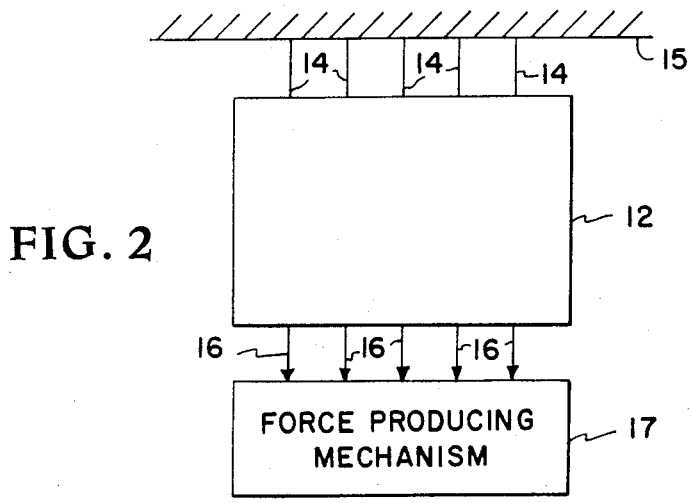
FIG. 2 is a side view of the substrate and force-producing mechanism in FIG. 1.

The embodiment of the invention disclosed in FIGS. 1 and 2 is for a uniaxial load; however, a biaxial load will work equally well. That is, a load could be applied to substrate 12 in two directions instead of one direction. Hence, a pressurization technique would work well for the thermal control of large pressurized membrane enclosures. Any increase in pressure would create a positive strain field and thus increase the transmitted radiant energy and any decrease in pressure would decrease the transmitted energy.

There are many possible applications of this invention. For example, it could be used as a passive thermal control for a gas-pressurized spacecraft to facilitate the removal of internally generated heat. This is accomplished by stretching the thin film coating under the influence of the increased pressure of the heated gas whereupon energy is radiated from the interior of the spacecraft to the exterior. As the gas cools, the pressure is reduced causing the imposed strain to be reduced and, therefore, less energy to be transmitted to the exterior. Also, the invention could be used as an active thermal control system in which the thin film is mechanically deformed to regulate the amount of radiant energy transmitted into and out of the spacecraft. Another use of the invention would be thermal control shades for homes and industrial use. A further use would be as a greenhouse window regulator. In addition, the invention concept has potential application as an amplifying element in a mechanical optical control system.

The primary advantage of this invention is its ability to vary the magnitude of electromagnetic energy transmitted by a medium over a continuous range of values rather than for only a couple of discrete values.

It is to be understood that the form of the invention herewith shown and described is to be taken as a preferred embodiment. Various changes may be made in the shape, size and arrangement of parts. For example, equivalent elements may be substituted for those illustrated and described herein. Parts may be reversed, and certain features of the invention may be utilized independently of the use of other features all without departing from the spirit or scope of the invention as defined in the subjoined claims. Inasmuch as reflectance is inversely related to transmittance, this device can be used to vary reflectance instead of transmittance. The specific embodiment of the invention disclosed uses visible light as the electromagnetic energy; however, other electromagnetic energy could be used.

What is claimed as new and desired to be secured by Letters Patent of the United States is:

1. A device for regulating the transmission of energy from an electromagnetic source through a medium comprising: a low modulus substrate, that is transparent to said energy, located in the path of the energy from said electromagnetic source; a highly absorbing thin film deposited on a surface of said substrate, the combination of said substrate and said thin film being said medium; and means for stretching said substrate whereby the thickness of said thin film is decreased and microfractures occur in the thin film thereby increasing the transmission of said energy through said medium.

2. A device according to claim 1 wherein said energy from an electromagnetic source is visible light.

3. A device according to claim 1 wherein said low modulus substrate is made from silicone rubber.

4. A device according to claim 1 wherein said thin film is a metallic film from 10 A. to 1000 A. thick.

References Cited

UNITED STATES PATENTS

| | | | |
|---|---|---|---|
| 2,403,915 | 7/1946 | Evans | 350—161 |
| 3,041,395 | 6/1962 | Mast | 350—161 |
| 3,462,223 | 8/1969 | Tiemann et al. | 356—32 |

RONALD L. WIBERT, Primary Examiner

J. ROTHENBERG, Assistant Examiner

U.S. Cl. X.R. -

350—1